United States Patent [19]

Colberg et al.

[11] Patent Number: 4,648,993
[45] Date of Patent: Mar. 10, 1987

[54] CATIONIC PHTHALOCYANINE DYES

[75] Inventors: Horst Colberg, Schifferstadt; Udo Mayer, Frankenthal, both of Fed. Rep. of Germany

[73] Assignee: BASF Aktiengesellschaft, Ludwigshafen, Fed. Rep. of Germany

[21] Appl. No.: 752,598

[22] Filed: Jul. 8, 1985

[30] Foreign Application Priority Data

Jul. 7, 1984 [DE] Fed. Rep. of Germany ....... 3425132

[51] Int. Cl.$^4$ ............................................. C09B 47/32
[52] U.S. Cl. ..................................... 540/134; 540/125
[58] Field of Search ........................... 260/242.2, 245.8

[56] References Cited

U.S. PATENT DOCUMENTS

| | | | |
|---|---|---|---|
| 3,210,345 | 10/1965 | Gamlen et al. | 260/245.8 X |
| 3,954,392 | 5/1976 | Dien | 260/245.8 X |
| 4,537,721 | 8/1985 | Groll et al. | 260/242.2 |
| 4,565,688 | 1/1986 | Malin et al. | 260/245.8 |

FOREIGN PATENT DOCUMENTS 446578 3/1978 Switzerland.

Primary Examiner—Richard L. Raymond
Attorney, Agent, or Firm—Oblon, Fisher, Spivak, McClelland & Maier

[57] ABSTRACT

A compound useful for dyeing acid-modified fibers, having the formula

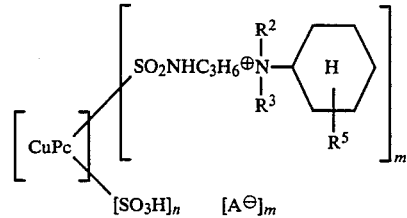

where $R^5$ is hydrogen, methyl or ethyl; $R^2$ and $R^3$ are each methyl, ethyl, $\beta$-hydroxyethyl, $\beta$-hydroxypropyl or benzyl; $A^-$ is an anion; m is 2 or 3 and n is 0.1 to 1 based on statistical averages.

6 Claims, No Drawings

CATIONIC PHTHALOCYANINE DYES

The present invention relates to compounds which, in the form of the free acids, are of the general formula I

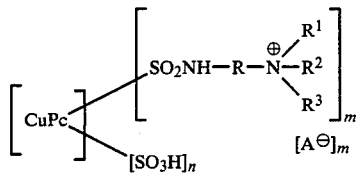

where $m+n$ is from 2 to 4, $A^{\ominus}$ is an anion, R is an alkylene radical which may be interrupted by —O—, piperazinylidene or

and $R^1$, $R^2$ and $R^3$ are each unsubstituted or substituted alkyl, allyl or cycloalkyl, or one of the radicals may furthermore be benzyl, the sum of the carbon atoms of $R^1$, $R^2$ and $R^3$ being not less than 8, and $R^4$ is hydrogen, methyl, ethyl, propyl or allyl.

Examples of alkylene radicals R are:
$C_2H_4$, $C_3H_6$,

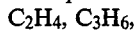

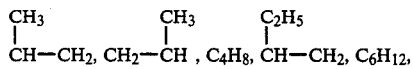

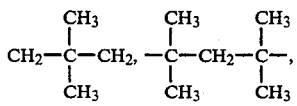

$C_2H_4OC_2H_4$, $C_3H_6OC_3H_6$, $C_3H_6OC_2H_4OC_3H_6$,
$C_3H_6OC_4H_8OC_3H_6$, $C_3H_6OC_2H_4OC_2H_4OC_3H_6$,
$C_2H_4NHC_2H_4$, $C_2H_4NHC_3H_6$, $C_3H_6NHC_3H_6$,
$C_3H_6NHC_2H_4NHC_3H_6$, $C_3H_6NHC_6H_{12}NHC_3H_6$,

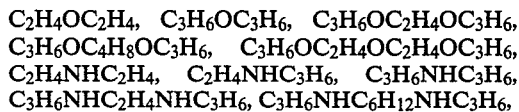

preferably $C_2H_4$ or, in particular, $C_3H_6$.

Examples of suitable alkyl radicals $R^1$, $R^2$ and $R^3$ are those of 1 to 18 carbon atoms which may furthermore be interrupted by oxygen and substituted by hydroxyl or $C_1$-$C_8$-alkoxy.

Specific examples of radicals are:
$CH_3$, $C_2H_5$, $C_3H_7$, $C_4H_9$, $C_5H_{11}$, $C_6H_{13}$, $C_8H_{17}$,

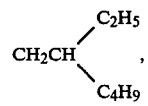

$C_{10}H_{21}$, $C_{12}H_{25}$, $C_{13}H_{27}$, $C_{16}H_{31}$, $C_{18}H_{35}$,
$C_2H_4OH$, $C_3H_6OH$, $C_2H_4OCH_3$, $C_2H_4OC_2H_5$,
$C_2H_4OC_3H_7$, $C_2H_4OC_4H_9$, $C_2H_4OC_8H_{17}$,
$C_3H_6OCH_3$, $C_3H_6OC_4H_9$,

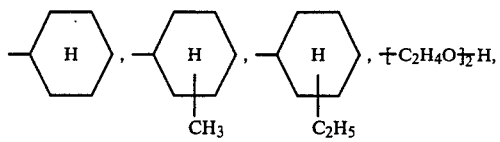

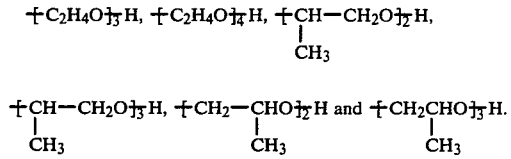

In the case of radicals which can occur as isomers, the above formulae embrace both the n- and the iso-radicals.

One of the radicals $R^1$, $R^2$ and $R^3$ is preferably of more than 5 carbon atoms, cyclohexyl, methylcyclohexyl, 2-ethylhex-1-yl and tridecyl being particularly preferred.

m is preferably from 2 to 3 and n is from 0.1 to 1 (statistical averages).

Examples of anions $A^{\ominus}$ are chloride, bromide, hydrogen sulfate, sulfate, nitrate, phosphate, hydrogen phosphate, dihydrogen phosphate, carbonate, bicarbonate, tetrachlorozincate, aminosulfonate, methylsulfonate, methylsulfate, ethylsulfate, formate, acetate, hydroxyacetate, aminoacetate, methoxyacetate, propionate, lactate, maleate, malonate, citrate, benzoate, phthalate, benzenesulfonate, toluenesulfonate, oleate and dodecylbenzenesulfonate.

For the preparation of compounds of the formula I, the radical $R^3$ can be introduced by a conventional method into a compound of the formula II

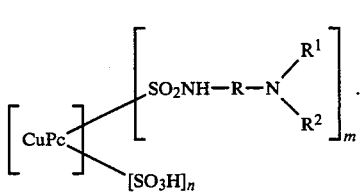

Typical methods of preparation are described in the Examples, in which parts and percentages are by weight, unless stated otherwise.

The compounds of the formula I are useful for dyeing acid-modified fibers, such as polyacrylonitrile or polyesters, leather and in particular paper. In particular, paper may furthermore be printed with printing inks which contain aqueous solutions of addition salts of I with acids. In the form of the bases or salts with fairly long-chain carboxylic or sulfonic acids, such as oleic acid or dodecylbenzenesulfonic acid, they are also suitable, for example, for ballpoint pastes, as solvent dyes and for non-aqueous printing inks. In the form of acid addition salts with appropriate anions, the dyes are also readily soluble in water and organic solvents, so that they are suitable for the preparation of liquid concentrates.

Of particular importance are compounds of the formula

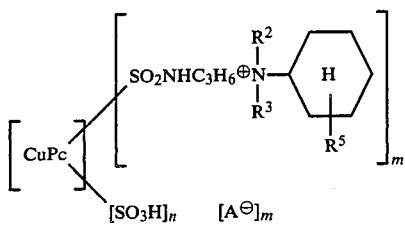

where $R^5$ is hydrogen, methyl or ethyl, $R^2$ and $R^3$ are each methyl, ethyl, β-hydroxyethyl, β-hydroxypropyl or benzyl, and $A^\ominus$, m and n have the stated meanings.

EXAMPLE 1

4.46 parts of a dye base which can be prepared from copper phthalocyanine by sulfochlorination by a conventional method and reaction with N-cyclohexyl-1,3-propylenediamine and contains about 2.5 sulfamide groups and 0.5 sulfo group per molecule, in 17 parts of water, are stirred with 0.79 part of magnesium oxide. 7.2 parts of dimethyl sulfate are added dropwise at 0° C., and stirring is continued for 2 hours, an increase in the temperature at 15° C. being permitted. 6.8 parts of 25% strength aqueous ammonia are added dropwise, once again at 0° C., stirring is continued for 2 hours and the mixture is carefully heated to 70° C. It is then allowed to cool, the product is filtered off under suction, washed with dilute ammonia water and dried to give 7.1 parts of a dye containing foreign electrolytes. This dye can be dissolved in water and glacial acetic acid, with the addition of organic solvents, eg. methylglycol or thiodiglycol, to give stable liquid formulations, or can be milled with a solid acid, eg. amidosulfonic acid, to give a powder. In solution in acetic acid, the compound is of the formula

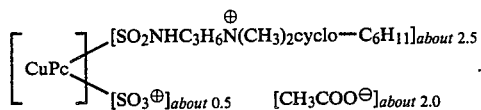

Other dyes substantially similar in hue and affinity to that of Example 1 can be prepared by a process similar to that described.

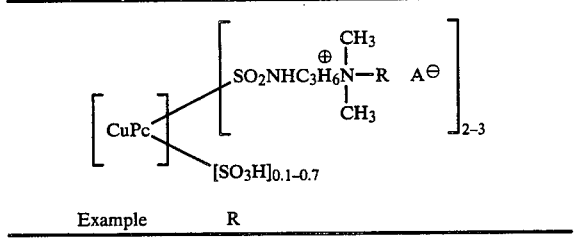

| Example | R |
|---|---|
| 2 | 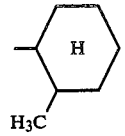 |
| 3 | $-CH_2CHC_4H_9-(n)$<br>      $\|$<br>      $C_2H_5$ |

-continued

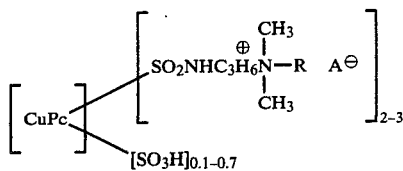

| Example | R |
|---|---|
| 4 | $-CHC_5H_{11}-(n)$<br>    $\|$<br>    $CH_3$ |
| 5 | $-CH(CH_2)_3CHCH_3$<br>    $\|$                    $\|$<br>    $CH_3$              $CH_3$ |
| 6 | $-C_{13}H_{27}$ |
| 7 | $-CH_2-\phenyl$ |
| 8 | $-C_{18}H_{37}-(n)$ |
| 9 | $-(CH_2)_8CH=CH(CH_2)_7CH_3$ |
| 10 | $-CH_2CH_2-\phenyl$ |

EXAMPLE 11

4.5 parts of a dye base, which can be prepared from copper phthalocyanine by sulfochlorination by a conventional method and reaction with N-cyclohexyl-N-methyl-1,3-propylenediamine and contains about 2.5 sulfamide groups and about 0.5 sulfo group per molecule, and 0.4 part of magnesium oxide are suspended in 20 parts of chloroform, and 3.6 parts of dimethyl sulfate are added at 50° C. The mixture is refluxed for 3 hours, cooled, and acidified with concentrated hydrochloric acid, the chloroform is distilled off, and the product is precipitated by adding zinc chloride, and is dried to give 5 parts of a dye powder containing foreign electrolytes. The formula corresponds to that of the product of Example 1, $(CH_3COO^\ominus)_{about\ 2.0}$ being replaced by $(ZnCl_4{}^{2\ominus})_{about\ 1.0}$. The dyes described in Examples 2–10 can likewise be prepared by this process.

EXAMPLE 12

118.5 parts of a dye base which can be prepared from copper phthalocyanine by sulfochlorination by a conventional method and reaction with N-cyclohexyl-1,3-propylenediamine and contains about 2.5 sulfamide groups and about 0.5 sulfo group per molecule are stirred in water, with the addition of 0.2 part of a sodium salt of a sulfosuccinic ester. 100 g of ethylene oxide are forced in a little at a time, and the mixture is kept at 80° C. for a total of 6 hours, after which it is cooled and filtered under suction, and the residue is dried at 40° C. 130 parts of a dye of the formula

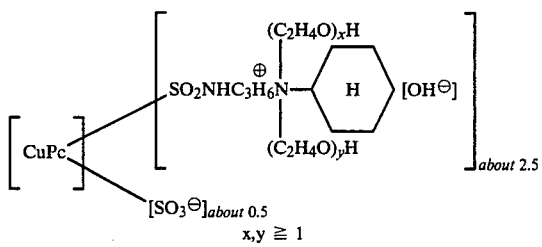

are obtained, the dye containing 3.8% of Cu.

Instead of the intermediate described, it is also possible to use the intermediates of Examples 2-10 to synthesize the similar oxyethylated dyes. Instead of ethylene oxide, propylene oxide may also be used in the same way, the formulae of the resulting dyes being derived from the formulae of the dyes described above in this example by replacing —C$_2$H$_4$— by

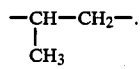

EXAMPLE 13

2 parts of a 10% strength solution of the dye from Example 1 in acetic acid are added to a suspension of 50 parts of bleached sulfate pulp of about 30° SR in 2,000 parts of water at pH 7, and the mixture is stirred for 15 minutes at from 20° to 25° C. and then diluted with water to a solids content of 0.2%. This suspension is used to produce paper sheets on a laboratory sheet former, and the sheets are dried for 5 minutes at 100° C., blue sheets being obtained. The effluent is colorless and the fastness to bleeding in the presence of water is excellent. No reduction in the color strength is observed right up to high degrees of hardness when inorganic anions, such as chloride, sulfate, phosphate or carbonate, are present in the dye liquor. The reductive bleachability with hydrosulfite is good. The dyes from Examples 2-10 and 12 gives similar dyeing results.

EXAMPLE 14

1.0 part of the product obtained by milling 90% of the dye from Example 1 and 10% of amidosulfonic acid are sprinkled into a stirred suspension of 100 parts of a mixture of 70% of bleached pine sulfate pulp and 30% of bleached birch sulfate pulp in 2,000 parts of water, the total stock being of about 30° SR. The mixture is stirred for 10 minutes and diluted with water to a solids content of 0.2%, after which paper sheets are produced on a laboratory sheet former and dried for 5 minutes at 100° C. The sheets obtained exhibit a level blue dyeing and possess excellent fastness to bleeding in the presence of water. The use of products obtained by milling the dyes from Examples 2-10 and 12 with amidosulfonic acid gives similar dyeing results.

EXAMPLE 15

An absorptive web of unsized paper is drawn, at 40°-50° C., through a dye solution consisting of 0.5 part of the dye from Example 1, 0.5 parts of starch, 3 parts of acetic acid and 96 parts of water, and the excess dye solution is pressed out between two rollers. The dried paper web is found to be dyed blue.

The dyes from Examples 2-10 and 12 can also be used in a similar manner.

We claim:

1. A compound useful for dyeing acid-modified fibers, having the formula

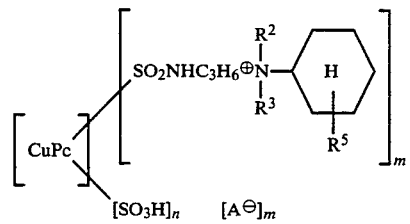

where $R^5$ is hydrogen, methyl or ethyl; $R^2$ and $R^3$ are each methyl, ethyl, β-hydroxyethyl, β-hydroxypropyl or benzyl; $A^-$ is an anion, m is 2 or 3 and n is 0.1 to 1 based on statistical averages.

2. The compound according to claim 1, wherein $R^5$ is methyl.

3. The compound according to claim 1, wherein $A^-$ is an anion selected from the group consisting of chloride, bromide, hydrogen sulfate, sulfate, nitrate, phosphate, hydrogen phosphate, dihydrogen phosphate, carbonate, bicarbonate, tetrachlorozincate, aminosulfonate, methylsulfonate, methylsulfate, ethylsulfate, formate, acetate, hydroxyacetate, aminoacetate, methoxyacetate, propionate, lactate, maleate, malonate, citrate, benzoate, phthalate, benzenesulfonate, toluenesulfonate, oleate and dodecylbenzenesulfonate.

4. The compound according to claim 1, which is

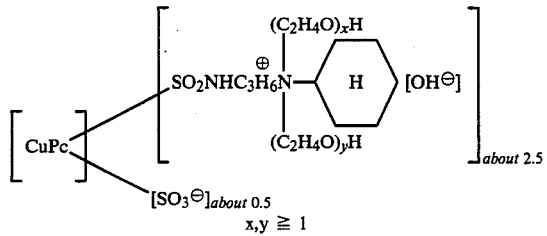

5. The compound according to claim 1, which is

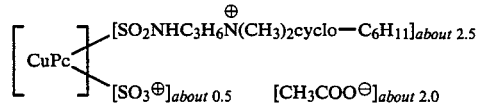

6. The compound according to claim 1, which is

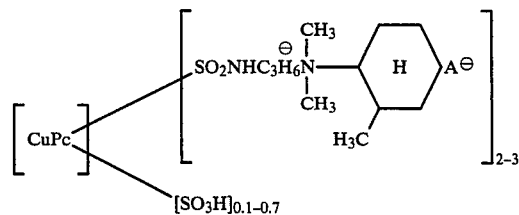

* * * * *